United States Patent [19]

Fujinami et al.

[11] Patent Number: 5,940,351
[45] Date of Patent: Aug. 17, 1999

[54] INFORMATION RECORD MEDIUM AS WELL AS EDITING APPARATUS AND REPRODUCING APPARATUS FOR THE SAME

[75] Inventors: Yasushi Fujinami; Jun Yonemitsu, both of Kanagawa, Japan

[73] Assignee: Sony Corporation, Tokyo, Japan

[21] Appl. No.: 08/197,677

[22] Filed: Feb. 17, 1994

Related U.S. Application Data

[63] Continuation of application No. 07/921,122, Jul. 29, 1992, abandoned.

[30] Foreign Application Priority Data

Aug. 1, 1991 [JP] Japan .................................. 3-215972

[51] Int. Cl.$^6$ .................................................. G11B 7/085

[52] U.S. Cl. ............................ 369/32; 369/50; 386/53; 386/54; 386/70; 386/75

[58] Field of Search .................................. 369/32, 83, 47, 369/50; 358/311, 335, 342; 360/14.1–14.3, 33.1; 386/52–54, 55, 57, 69–70, 75

[56] References Cited

U.S. PATENT DOCUMENTS

| 4,425,586 | 1/1984 | Miller | 358/335 |
|---|---|---|---|
| 5,056,075 | 10/1991 | Maruta et al. | 369/58 X |
| 5,107,481 | 4/1992 | Miki et al. | 369/58 X |
| 5,124,963 | 6/1992 | Ando | 369/50 X |

*Primary Examiner*—W. R. Young
*Attorney, Agent, or Firm*—Frommer Lawrence & Haug, LLP.; William S. Frommer

[57] ABSTRACT

An information record medium from which only necessary record information can be reproduced as well as an editing apparatus and a reproducing apparatus designed to edit and reproduce the information record medium, respectively, to allow such selective reproduction of necessary record information. Video information, audio information, simple edition information and so forth are recorded in a time division multiplexed condition for each block on each track of the record medium. The simple edition information includes a header, a length or time period and edition data. The edition data includes a jump command, a track end command, a temporary stop command, a fade-in/fade-out command, a repeat command, an insert command, a composition command or the like.

14 Claims, 5 Drawing Sheets

F I G. 5
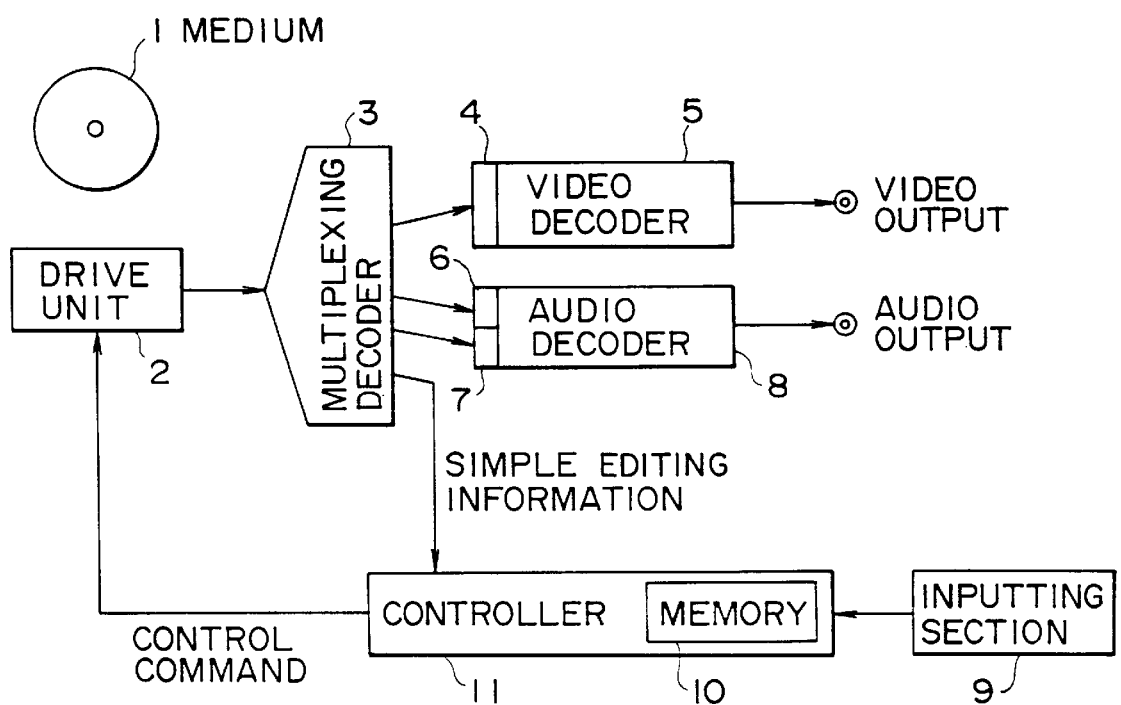

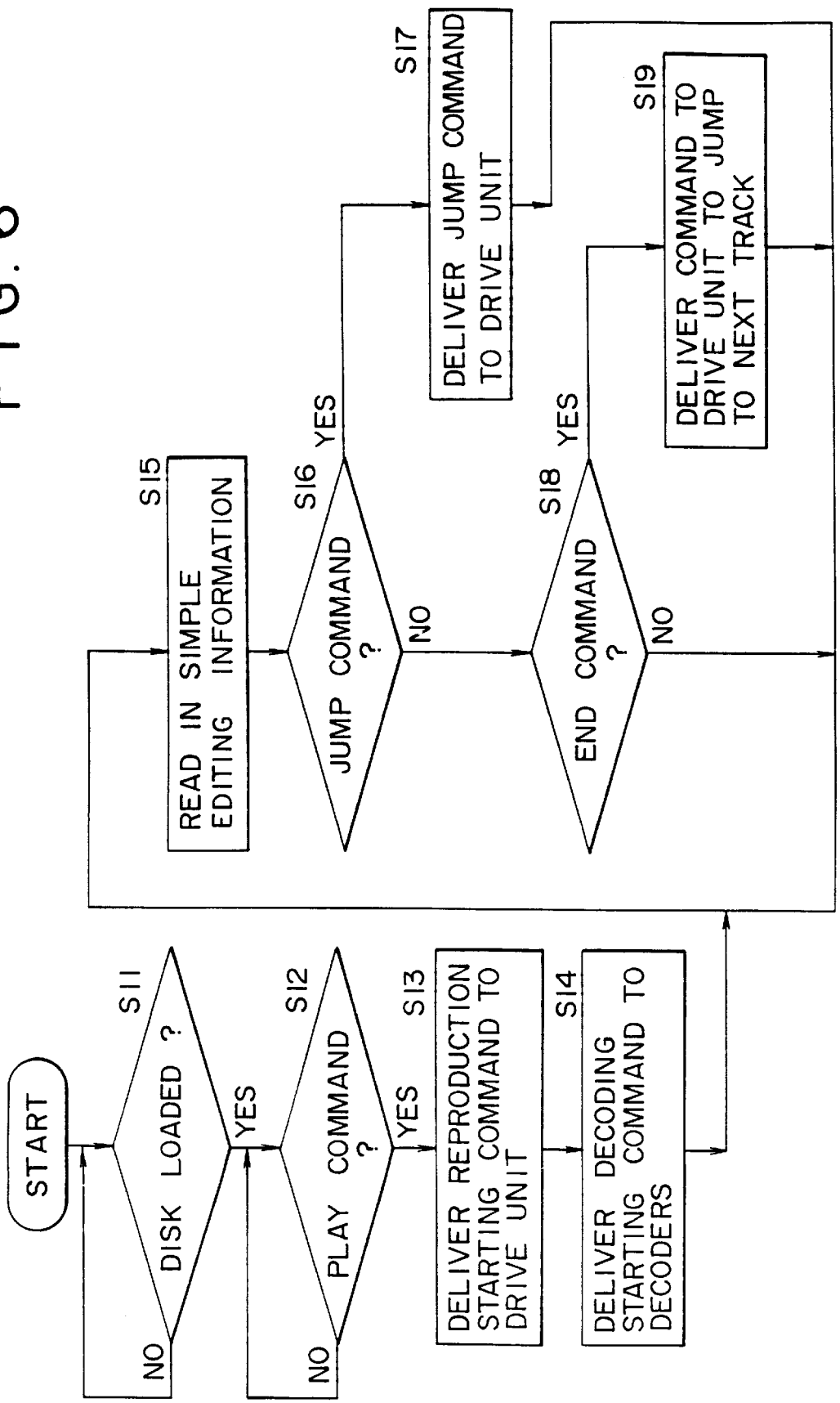

INFORMATION RECORD MEDIUM AS WELL AS EDITING APPARATUS AND REPRODUCING APPARATUS FOR THE SAME

This application is a continuation of application Ser. No. 07/921,122 filed Jul. 29, 1992, now abandoned.

BACKGROUND OF THE INVENTION

1. Field of the Invention

This invention relates to an information recording medium such as a magnetic disk or an opto-magnetic disk suitable for recording thereon information in the form of a video signal and/or an audio signal and also relates to an apparatus for editing and an apparatus for reproducing the information recorded on the information recording medium.

2. Description of the Related Art

A video tape recorder integrated with a video camera is commonly used for recording video signals relating to various subjects on a video tape. Usually, the recording of the video signals is performed at random. In particular, when, for example, a user takes a video camera-recorder to a children's athletic event in order to record various scenes from the athletic event, the user will record various scenes focusing upon the user's child. Since the user is not always very familiar with how to operate the camera-recorder, it sometimes happens that the user believes that a recording operation has been stopped, when in fact the recording operation continues so that unintended scenes are recorded.

The unintended scenes can be eliminated by editing of the video tape that has been recorded in this manner. However, at least two video decks are required in order to perform an editing operation. Moreover, such an editing operation is complicated and cumbersome. Accordingly, editing operations are not usually performed.

On the other hand, when an unedited video tape is reproduced, the user is forced to view the unintended scenes which reduces the user's interest in the tape.

SUMMARY OF THE INVENTION

It is an object of the present invention to provide an information recording medium which can be readily edited.

It is another object of the present invention to provide an editing apparatus and a reproducing apparatus by which editing of an information recording medium can be readily performed.

The foregoing objects are achieved, according to one aspect of the present invention, by providing an information recording medium having recorded thereon recording information in the form of information blocks and also having recorded thereon, interspersed with the recording information, editing information for establishing a sequence in which the blocks of recording information are to be reproduced from the information recording medium. The recording information may include video information and audio information, and the editing information may include at least one of a jump command, a track end command, a temporary stop command, a fade-in/fade-out command, a repeat command, an insert command and a composition command. The editing information may further include a header and information representative of a length of a reproduction signal. Preferably, the information recording medium is a disk.

With the information recording medium as just described, the recording information including the audio signal and/or the video signal can be reproduced continuously and accurately in accordance with the editing information. Accordingly, even if the information recording medium has undesired recording information recorded thereon, it is possible to reproduce only the desired recording information from the information recording medium.

According to another aspect of the present invention, there is provided an apparatus for editing recording information recorded on a recording medium which comprises inputting means for inputting editing information for editing the recording information recorded on the recording medium, recording means for recording the editing information inputted by way of the inputting means on the recording medium, and reproducing means for reproducing portions of the recording information from the recording medium in a sequence determined in accordance with the editing information inputted by way of the inputting means. Preferably the editing information includes at least one of a jump command, a track end command, a temporary stop command, a fade-in/fade-out command, a repeat command, an insert command and a composition command, and the editing apparatus further comprises a memory for storing the editing information. The editing apparatus may further comprise a buffer memory for temporarily storing the recording information reproduced by the reproducing means from the recording medium. Moreover, the recording information preferably includes multiplexed video information and audio information, and the reproducing means comprises means for demultiplexing the video information and the audio information.

With the editing apparatus as just described, editing information such as a jump command or a track end command can be inputted by way of the inputting means, and a test reproduction can be performed in accordance with the editing information thus inputted. Then, after review of the test reproduction, additional test reproductions may be performed as needed until a satisfactory reproduction sequence is achieved with the editing information then being recorded on the recording medium. Accordingly, a desired editing condition can be reliably achieved by way of a simple editing operation.

According to a further aspect of the present invention, there is provided an apparatus for reproducing recording information that is recorded on a recording medium together with editing information interspersed with the recording information for establishing a sequence in which the recording information is to be reproduced which comprises drive means for reproducing the recording information together with the editing information to provide a reproduction signal, reading means for reading editing information included within the reproduction signal provided by the drive means, and controlling means for controlling positioning of the drive means relative to the recording medium in accordance with the editing information read by the reading means so that the recording information is reproduced by the drive means in the sequence established by the editing information. The editing information may include at least one of a jump command, a track end command, a temporary stop command, a fade-in/fade-out command, a repeat command, an insert command and a composition command. Preferably the recording information includes multiplexed video information and audio information, and the drive means comprises means for demultiplexing the video information and the audio information. Also the reproducing apparatus preferably further comprises a buffer memory for temporarily storing the recording information.

With the reproducing apparatus as just described, the position of the drive means is controlled in accordance with the editing information read out with respect to each block of information recorded on the recording medium. Consequently, when the medium is to be reproduced, it is possible to continuously and accurately reproduce the desired recording information from the medium without inputting specific commands.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 5 is a block diagram showing reproducing apparatus in which the present invention is applied; and FIG. 6 is a flow chart illustrating operation of the reproducing apparatus shown in FIG. 5.

DETAILED DESCRIPTION OF THE PREFERRED EMBODIMENTS

Figure 1:
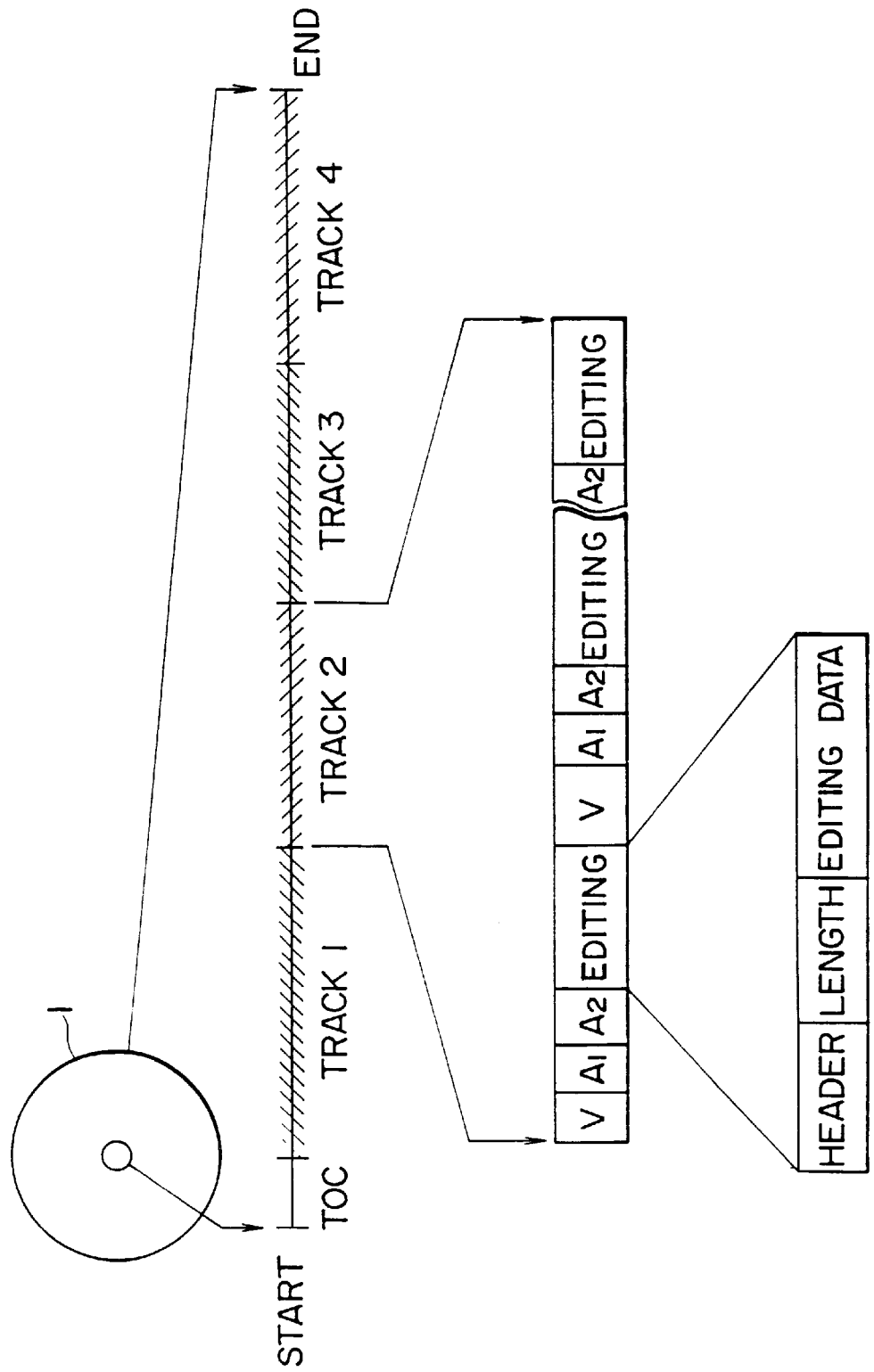
FIG. 1 is a diagrammatic view showing a recording format of an information recording medium in which the present invention is applied.

Referring first to FIG. 1, there is shown a recording format for an information recording medium to which the present invention is applied. In the present embodiment, a video signal and an audio signal are recorded in the form of information in a time division multiplexed condition onto a disk 1 which may be, for example, a magnetic disk or an opto-magnetic disk. TOC information is recorded on an innermost circumferential track of the disk 1, and in the present embodiment, four tracks of recording information are respectively recorded on tracks TRACK 1 to TRACK 4. Each track has a video signal V, a left channel audio signal A1, a right channel audio signal A2 and simple editing information recorded in a time division multiplexed condition in each block. The simple editing information includes a header, a length (of time) of a reproduction signal to be reproduced as a result of the editing, and editing data. The editing data may include a jump command, a track end command, a temporary stop command, a fade-in/fade-out command, a repeat command, an insert command, a composition command, and so forth.

Figure 2:
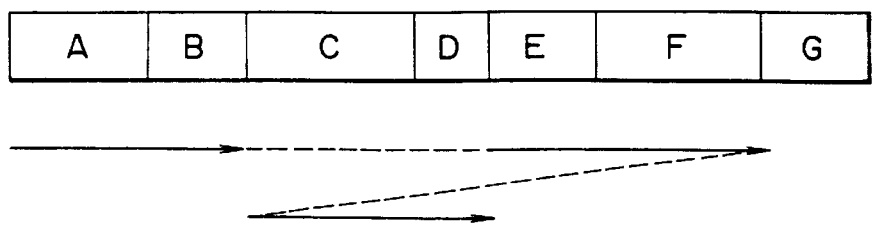
FIG. 2 is a diagrammatic view illustrating editing of the information recording medium shown in FIG. 1.

If the editing data indicate that information recorded, for example, in areas A, B, C, D, E and F shown in FIG. 2, is to be reproduced such that information in the areas A and B is reproduced first and then the reproduction is to jump from the end position of the area B to the start position of the area E and thereafter information in the areas E and F is reproduced, whereafter the reproduction is to jump from the end position of the area F to the start position of the area C and then information in the areas C and D is reproduced until the end of the area D is reached, then the length information indicates a total period of time required for the reproduction of the information of the areas A, B, E, F, C and D.

Figure 3:
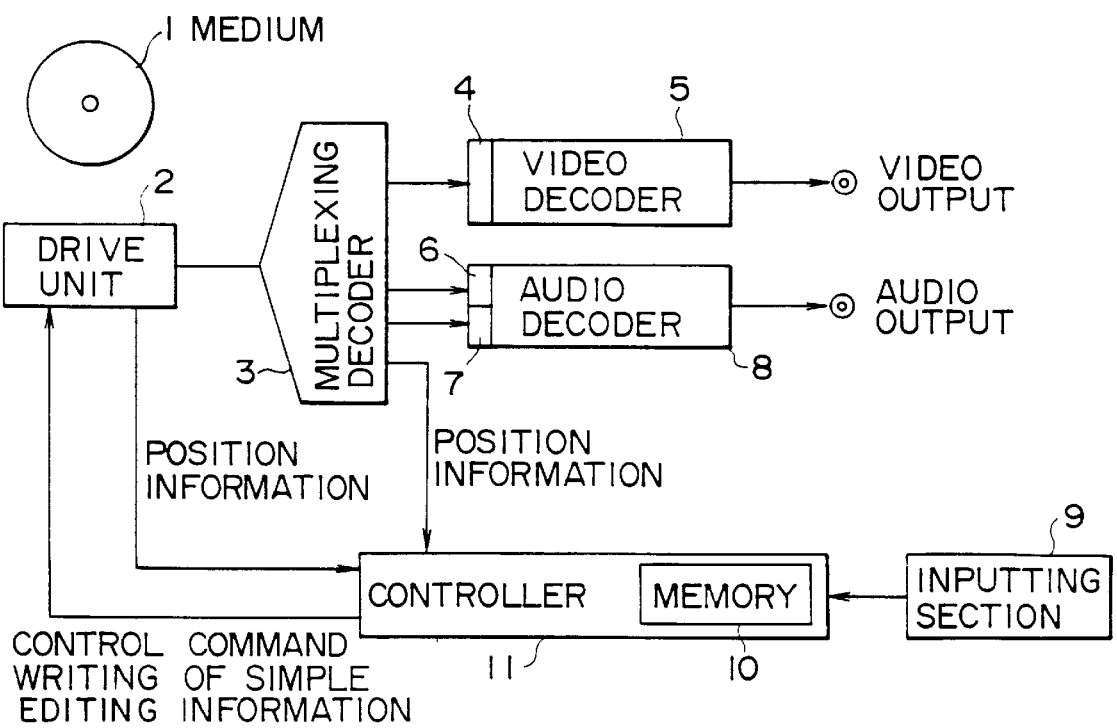
FIG. 3 is a block diagram showing an editing apparatus in which the present invention is applied.

Referring now to FIG. 3, there is shown an editing apparatus in which the present invention is applied. The editing apparatus includes a drive unit 2 for driving a disk 1 in order to record data onto the disk 1 or reproduce data recorded on the disk 1. A multiplexing decoder 3 separates reproduction data outputted from the drive unit 2 into video data and audio data and supplies the video data and the audio data to a video decoder 5 and an audio decoder 8, respectively. Further, the drive unit 2 reads simple editing information from the tracks of the disk 1 and supplies it to a controller 11. The video decoder 5 has a buffer memory 4 while the audio decoder 8 has a pair of buffer memories 6 and 7 so that data inputted thereto may be temporarily stored therein. An inputting section 9 is operated when predetermined editing information is to be inputted to the controller 11. The thus inputted simple editing information is stored into a memory 10 included in the controller 11.

Figure 4:
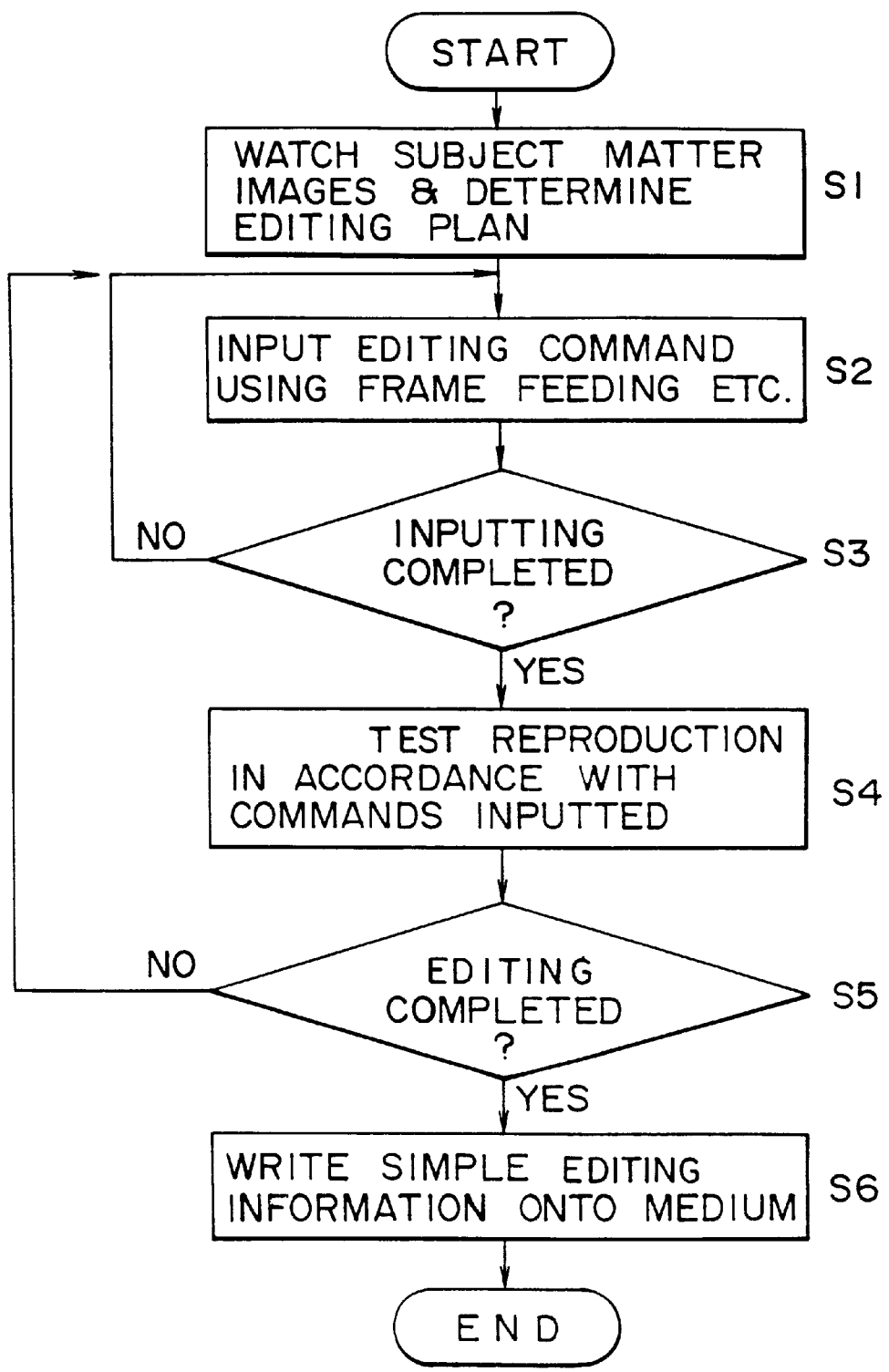
FIG. 4 is a flow chart illustrating operation of the editing apparatus shown in FIG. 3.

Operation of the editing apparatus described above will now be described with reference to FIGS. 3 and 4. After the disk 1 is loaded into the drive unit 2, the drive unit 2 reads the TOC information of the disk 1 and supplies the resulting data to the controller 11. The TOC information includes addresses of video signals and audio signals recorded on the disk 1 (for example, the positions of the start points and the end points of the programs (tracks TRACK1 to TRACK4) shown in FIG. 1), reproduction times and so forth. Consequently, the controller 11 can provide access to desired portions of the recording information.

First at step S1, the user views images corresponding to the recorded signals and decides upon an editing plan. In particular, the user operates the inputting section 9 to instruct the controller 11 to reproduce a desired track. In response to the instruction, the controller 11 delivers to the drive unit 2 a command for reproduction of the track selected by way of the inputting section 9. The drive unit 2 thus reproduces the selected track of the disk 1 and supplies the reproduced data to the multiplexing decoder 3. The multiplexing decoder 3 separates data received thereby into video data and audio data. The video data are supplied to and stored in the buffer memory 4 of the video decoder 5 and decoded by the video decoder 5. The decoded output of the video decoder 5 is outputted to a CRT (cathode ray tube) or a like display unit (not shown) so that it is displayed on the same. Meanwhile, the audio data are supplied to and stored in the buffer memories 6 and 7 for the left and right channels. The audio decoder 8 decodes the data stored in the buffer memories 6 and 7 and outputs the decoded data to a pair of loudspeakers corresponding to the left and right channels or a like audio apparatus (not shown).

Consequently, the user refines the editing plan while observing the video image on the CRT and listening to the audio outputs of the loudspeakers.

After the editing plan is determined, the process advances to step S2, at which editing commands are inputted with feeding of frames and so forth. If a program of recording information recorded, for example, in the areas A, B, C, D, E and F shown in FIG. 2 is to be edited such that information in the areas A and B is reproduced first and then reproduction jumps from the end position of the area B to the start position of the area E and information in the areas E and F is thereafter reproduced, whereafter reproduction jumps from the end position of the area F to the start position of the area C and then information in the areas C and D is reproduced until the end of the area D is reached, a jump command for reproduction to jump to the start point of the area E is recorded at the end point of the area B. Another jump command to jump reproduction to the start point of the area C is recorded at the end point of the area F. Further, a track end command is recorded at the end point of the area D. Such commands can be stored in the memory 10 of the controller 11 by way of operation of the inputting section 9.

At step S3, it is determined whether or not the inputting of editing information is completed, and if the inputting is not yet completed, the process returns to step S2 so that inputting of commands is performed repetitively. On the other hand, if it is determined at step S3 that the inputting of editing commands is completed, the process advances to step S4, at which test reproduction is performed in accordance with the inputted commands. In particular, the controller 11 then controls the drive unit 2 in accordance with the editing commands stored in the memory 10 to perform test reproduction. The user checks the editing operation by observing the reproduced signal. At step S5, it is determined whether or not editing is complete, and if it is determined that the editing is not complete, the process returns to step S2 in order to perform the processing at steps S2 et seq. again. In particular, the user will determine, while observing the test reproduction, whether or not the editing operation is satisfactory, and in case the editing operation is not satisfactory, the editing operation will be repeated.

On the other hand, if it is determined at step S5 that editing is complete, the process advances to step S6, at which the editing information is recorded onto the disk 1. In particular, when a command indicating completion of editing is inputted by way of the inputting section 9, the controller 11 supplies the editing commands stored in the memory 10 so that the same are recorded in predetermined positions on the disk 1 in accordance with the format shown in FIG. 1, thereby completing the editing operation.

The editing information can be assigned for each block of video data and audio data as shown in FIG. 1. Accordingly, very precise editing (jumping between blocks or the like) can be performed. At a block to which no specific editing information is assigned, editing information representative of this fact may be recorded, but alternatively recording of editing information may be omitted.

Referring now to FIG. 5, there is shown a reproducing apparatus in which the present invention is applied. The reproducing apparatus has basically the same construction and includes the same components as the editing apparatus shown in FIG. 3, but is different in that it does not have a recording function but only has a reproducing function. Thus, components of the reproducing apparatus corresponding to components of the editing apparatus shown in FIG. 3 are denoted by like reference numerals in FIG. 5.

Operation of the reproducing apparatus will now be described with reference to FIGS. 5 and 6. First at step S11, it is determined whether or not the disk 1 is loaded in the drive unit 2. When the loaded disk 1 is detected, the process advances to step S12, at which it is determined whether or not a command for reproduction is inputted. When it is determined that a command for reproduction is inputted by way of the inputting section 9, the process advances to step S13, at which the controller 11 delivers a command to start reproduction to the drive unit 2. Then, the process advances to step S14, at which the controller 11 delivers a command to start decoding to the video decoder 5 and the audio decoder 8. In this instance, the drive unit 2 reproduces information recorded on the disk 1 and supplies the reproduced information to the multiplexing decoder 3. The multiplexing decoder 3 separates the received data into video data and audio data and supplies the video data and the audio data to the buffer memory 4 of the video decoder 5 and the buffer memories 6 and 7 of the audio decoder 8, respectively. The video decoder 5 decodes the data stored in the buffer memory 4 and outputs the decoded data to the CRT or the like (not shown) so that the video data is displayed. Meanwhile, the audio decoder 8 processes the audio data stored in the buffer memories 6 and 7 for the left and right channels and supplies the processed audio data to the loudspeakers for the left and right channels so the audio data is audibly reproduced.

Next, the process advances to step S15, at which reading of editing information is performed. In particular, the multiplexing decoder 3 reads the editing information included in the reproduced data supplied from the drive unit 2 and outputs the editing information to the controller 11. The controller 11 determines at steps S16 and S18 whether the editing information read by multiplexing decoder 3 includes an editing command that is, for example, a jump command or a track end command (of course, in actual practice determination of the presence of another command or commands is also performed).

In case it is determined at step S16 that the editing command is a jump command, the process advances to step S17, at which the controller 11 supplies the jump command to the drive unit 2. In particular, in case a jump command is detected, for example, at the end point of the area B shown in FIG. 2, the drive unit 2 causes reproduction to jump from the end point of the area B to the start point of the area E. As a result, normal reproduction is resumed from the area E. Similarly, when a jump command is detected at the end position of the area F, reproduction jumps from the end position of the area F to the start position of the area C.

If it is determined at step S18 that a track end command is detected, the process advances to step S19, at which a command is provided so that reproduction jumps to the next track (program) to be reproduced. In particular, if a track end command is detected, for example, at the end point of the area D of FIG. 2, the controller 11 controls the drive unit 2 to jump reproduction to the next track. Then, the process returns to step S15 so that a similar process is performed again.

While reproduction from the disk is temporarily interrupted during jumps, the data are stored in the buffer memories 4 and 6, 7, so that if the capacities of the buffer memories are great enough to accommodate the longest period of time required for random access, then the reproduced image or sound is not interrupted.

While a disk is employed as a recording medium in the foregoing description, a magnetic tape or another type of medium may alternatively be employed.

Having now fully described the invention, it will be apparent to one of ordinary skill in the art that many changes and modifications can be made thereto without departing from the spirit and scope of the invention as set forth herein.

What is claimed is:

1. An information recording medium having table of contents (TOC) information recorded thereon in a TOC region and having recording information recorded thereon in a plurality of information blocks, each of said information blocks including a recording information area in which the recording information is recorded and an editing information area adjacent to said recording information area for recording therein editing information, the respective editing information area of at least one of said information blocks having recorded therein a jump command for indicating a point on said recording medium to which reproduction is to jump after reproduction of the recording information recorded in the respective information block thereby reproducing only desired portions of said recording information in a desired sequence.

2. An information recording medium according to claim 1, wherein the recording information includes video information and audio information.

3. An information recording medium according to claim 1, wherein the editing information recorded in a respective one of the editing information areas includes at least one of a track end command, a temporary stop command, a fade-in/fade-out command, a repeat command, an insert command and a composition command.

4. An information recording medium according to claim 3, wherein the editing information recorded in a respective one of the editing information areas further includes a header and information representative of a length of a reproduction signal.

5. An information recording medium according to any one of claims 1, 2, 3 or 4, wherein said information recording medium is a disk.

6. An apparatus for editing recording information recorded on a recording medium in a plurality of information blocks, each of said information blocks including a recording information area in which the recording information is recorded and an editing information area adjacent to said recording information area for recording therein editing information for editing the recording information recorded on said recording medium, the recording medium having table of contents (TOC) information recorded thereon in a TOC region, the apparatus comprising:

inputting means for inputting said editing information, the editing information inputted by said inputting means including a jump command for indicating a point on said recording medium to which reproduction is to jump;

recording means for recording the editing information inputted by said inputting means in at least some of said editing information areas on said recording medium, said jump command being recorded in at least one of said editing information areas; and reproducing means for reproducing the recording information from said recording means and for responding to said jump command included in the editing information by jumping to said point on said recording medium indicated by said jump command and reproducing the recording information commencing at said point on said recording medium after reproducing the recording information recorded in the respective information block of the editing information area in which said jump command was recorded thereby reproducing only desired portions of said recording information in a desired sequence.

7. An apparatus according to claim 6, wherein the editing information includes at least one of a track-end command, a temporary stop command, a fade-in/fade-out command, a repeat command, an insert command and a composition command, and further comprising a memory for storing the editing information.

8. An apparatus according to claim 6, further comprising a buffer memory for temporarily storing the recording information reproduced by said reproducing means from said recording medium.

9. An apparatus according the claim 6, wherein the recording information includes video information and audio information recorded together in a multiplexed condition, and said reproducing means includes means for demultiplexing the video information and the audio information.

10. An apparatus for reproducing recording information that is recorded on a recording medium in a plurality of information blocks, each of said information blocks including a recording information area in which the recording information is recorded and an editing information area adjacent to said recording information area for recording therein editing information, at least some of said editing information areas having editing information recorded therein, the editing information area of one of said information blocks having a jump command recorded therein, the recording medium having table of contents (TOC) information recorded thereon in a TOC region, the apparatus comprising:

drive means for reproducing from the recording medium the recording information together with the editing information to provide a reproduction signal including the jump command that was recorded in the editing information area of said one of said information blocks;

reading means for reading the jump command included within the reproduction signal provided by said drive means; and controlling means responsive to said jump command read by said reading means for controlling positioning of said drive means relative to said recording medium such that reproduction of said recording information jumps to a point on said recording medium indicated by said jump command after reproduction of the recording information recorded in said one of said information blocks thereby reproducing only desired portions of said recording information in a desired sequence.

11. An apparatus according to claim 10, wherein the editing information includes at least one of a track end command, a temporary stop command, a fade-in/fade-out command, a repeat command, an insert command and a composition command.

12. An apparatus according to claim 10, wherein the recording information includes video information and audio information recorded together in a multiplexed condition, and said drive means includes means for demultiplexing the video information and the audio information.

13. An apparatus according to claim 10, further comprising a buffer memory for temporarily storing the recording information reproduced by said drive means from said recording medium.

14. An information recording medium according to claim 1, wherein editing information is recorded in some but not all of the respective editing information areas of the information blocks.

* * * * *